(12) United States Patent
Chalfant

(10) Patent No.: US 6,364,325 B1
(45) Date of Patent: Apr. 2, 2002

(54) SHOPPING CART WITH MULTIPLE CHILD SEATS

(76) Inventor: Katie Chalfant, 2201 W. 79th Terr., Shawnee Mission, KS (US) 66208

( * ) Notice: Subject to any disclaimer, the term of this patent is extended or adjusted under 35 U.S.C. 154(b) by 901 days.

(21) Appl. No.: 08/923,774

(22) Filed: Sep. 2, 1997

Related U.S. Application Data

(63) Continuation of application No. 08/740,027, filed on Oct. 22, 1996, now abandoned, which is a continuation of application No. 08/292,098, filed on Aug. 17, 1994, now abandoned.

(51) Int. Cl.[7] .................................................. B62B 3/02
(52) U.S. Cl. .................................................. 280/33.993
(58) Field of Search ....................... 280/33.991, 33.992, 280/33.993, 33.996, 33.997, 47.35, 642, 647, 650, 658; 297/243, 244

(56) References Cited

U.S. PATENT DOCUMENTS

| | | | |
|---|---|---|---|
| 2,508,670 A | 5/1950 | Goldman | 280/33.993 |
| 2,837,344 A | 6/1958 | Young | 280/33.993 |
| 2,857,953 A | 10/1958 | Berger et al. | 280/47.35 |
| 2,911,227 A | 11/1959 | Davis | 280/33.993 |
| 2,970,845 A | 2/1961 | Thompson | 280/33.993 |
| 2,998,978 A | * 9/1961 | Sides | 280/33.993 |
| 3,157,410 A | * 11/1964 | Hummer | 280/33.993 |
| 3,497,234 A | 2/1970 | Schray | 280/33.993 |
| 3,503,622 A | 3/1970 | Romero | 280/33.993 |
| 4,682,782 A | 7/1987 | Mills | 280/33.993 |
| D336,993 S | 7/1993 | Gray | D6/333 |
| 5,312,122 A | 5/1994 | Doty | 280/33.992 |

FOREIGN PATENT DOCUMENTS

GB          867840        * 5/1961 ................. 280/650

* cited by examiner

Primary Examiner—Frank Vanaman
(74) Attorney, Agent, or Firm—Stinson, Mag & Fizzell, P.C.

(57) ABSTRACT

A shopping cart is provided with an undercarriage frame mounted upon wheels. The frame supports a basket and at least two seating sections for children. The seating sections are aligned such that both children, when seated, face backward and are positioned in line with one another. Each seating section is mounted upon an end wall, one of which is located at the rear of the cart and the second of which is located at an intermediate point along the cart proximate the rear end. Each seating section is formed with collapsible bottom and back member. When collapsed, the shopping cart affords primary and secondary basket regions with the secondary region located below the rearmost seat and serving the dual purpose of a leg area for the forwardmost child. In the first embodiment, both end walls are pivotally mounted to the basket and rotatable upward to allow multiple carts to be interconnected.

12 Claims, 3 Drawing Sheets

SHOPPING CART WITH MULTIPLE CHILD SEATS

This is a continuation of application Ser. No. 08/740,027 filed Oct. 22, 1996 which is a continuation of application Ser. No. 08/292,098 filed Aug. 17, 1994 now abandoned.

FIELD OF THE INVENTION

The present invention generally relates to a shopping cart which is constructed to provide seats for at least two children arranged in a front to back relationship.

BACKGROUND OF THE INVENTION

In the past, shopping carts have been provided which include a single baby seat, such as in U.S. Pat. No. 2,508,670 (Goldman); U.S. Pat. No. 2,837,344 (Young); U.S. Pat. No. 2,857,953 (Berger et al.); U.S. Pat. No. 2,911,227 (Davis); U.S. Pat. No. 2,970,845 (Thompson); U.S. Pat. No. 3,497,234 (Schray); U.S. Pat. No. 3,503,622 (Romero); and U.S. Pat. No. 4,682,782 (Mills).

For instance, the patent to Davis discloses a wheeled shopping cart with a nesting type seat having an article carrying basket with an end gate swingably supported along a rear end thereof. The child seat is collapsible and includes a hanging member which is pivotally supported by the end wall for movement about an axis parallel to the horizontal axis. The seat further includes bottom and back portions which are pivotally secured along one end of each to the hanging member for movement about a second axis parallel to the horizontal axis. An opposite end of the seat is engaged with a guide to limit the pivotal movement of the seat. The seat structure is easily collapsible and the rear end wall is pivotal upward to allow multiple carts to be combined.

The patent to Mills discloses a second type of shopping cart, also with, a baby seat. The cart of Mills includes a wheeled frame, a basket and a rear seat portion. The seat portion includes an upright rear wall having leg holes therethrough and a seat back upstanding from the rear seat portion. The basket is pivotally connected proximate the seat back and is rotated upward to interconnect multiple parts for storage.

The patent to Romero (incorporated herein by reference) discloses an alternative style shopping cart which includes a fixed rear seat mounted upon an upright support 11. A movable basket/receptacle forwardly projects from the seat and is hingedly mounted to the upright support. The basket rotates between a horizontal working position and a vertical storage position.

However, heretofore, these conventional shopping carts only offer seating for a single child. Thus, if a parent desired to shop with more than one child, the second child must either walk or ride within the basket. The former option was undesirable if the child is too small or disruptive. The latter option limited the amount of groceries which could be placed within the basket and proved quite unsafe as the child often fell out of the basket.

A need remains within the industry for an improved shopping cart. It is a primary object of the present invention to meet this need.

SUMMARY OF THE INVENTION

It is an object of the present invention to provide a shopping cart with safe seating for at least two children.

It is another object of the present invention to provide a shopping cart with two seats, whereby both children ride while facing backward without unduly limiting the space within the basket for carrying groceries.

It is another object of the present invention to provide seating for a second child within the shopping cart without requiring the cart to be overly enlarged and still providing a collapsible cart for storage.

In summary, a shopping cart is provided with an undercarriage frame mounted upon wheels. The frame supports a basket and at least two seating sections for children. The seating sections are aligned such that both children, when seated, face backward and are positioned in line with one another. Each seating section is mounted upon an end wall, one of which is located at the rear of the cart and the second of which is located at an intermediate point along the cart proximate the rear end. Each seating section is formed with collapsible bottom and back members. When collapsed, the shopping cart affords a primary basket region and a secondary region located proximate the rearmost seat and serving the dual purpose of a leg area for the forwardmost child and a secondary area to store groceries. Both end walls are pivotally mounted to the basket and rotatable upward to allow multiple carts to be interconnected.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
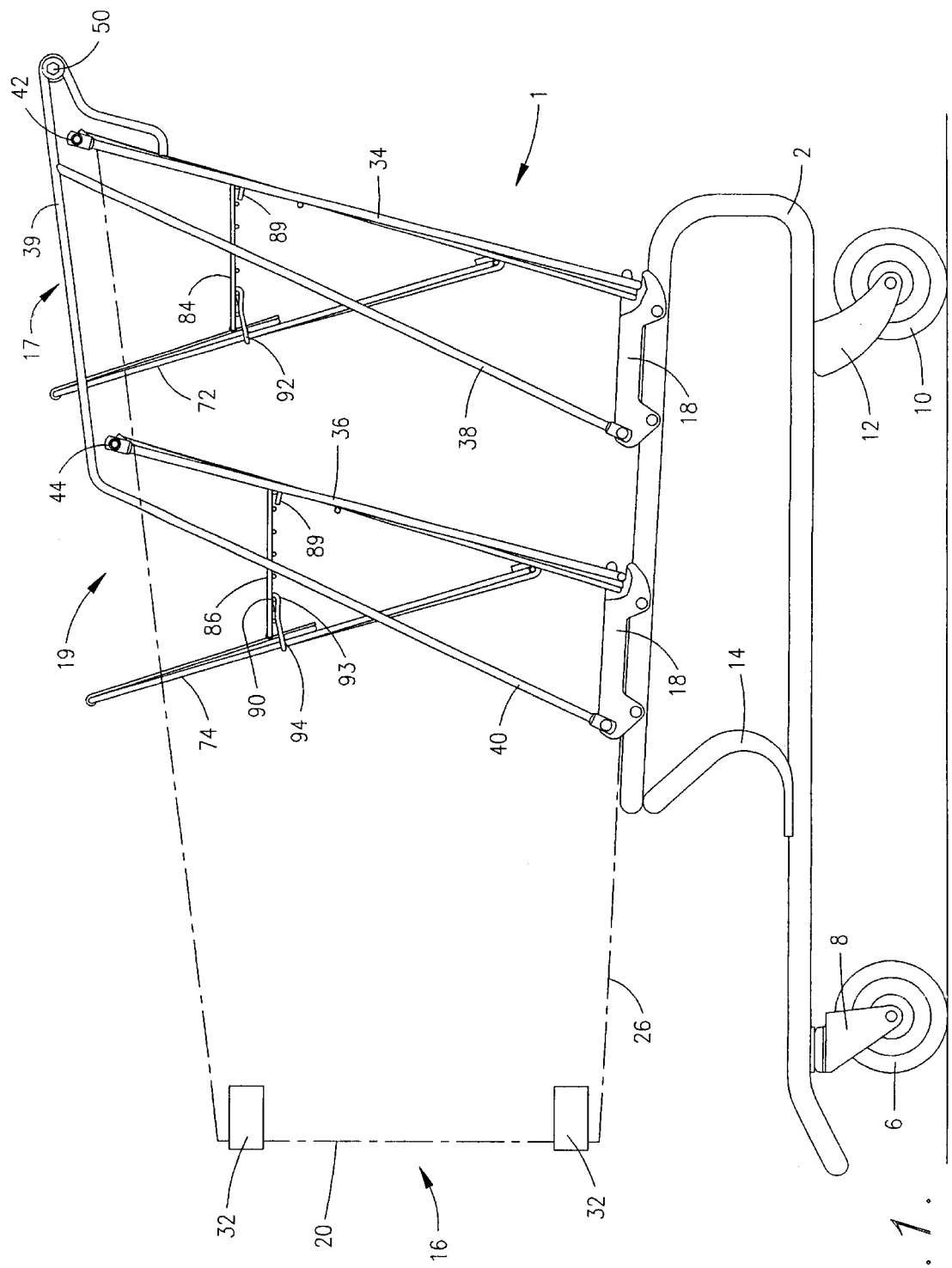
FIG. 1 illustrates a side planar view of a shopping cart according to the present invention.

FIG. 1 generally illustrates the present invention designated by reference numeral 1. The shopping cart 1 includes an undercarriage frame 2 having cross support brackets extending thereacross. The undercarriage frame 2 is supported upon caster-type front wheels 6 rotatably mounted to casters 8 which are pivotally attached to, and extend downward from, the front of the undercarriage frame 2. The rear wheels 10 are rotatably mounted to the undercarriage frame 2 through rigid legs 12. Optionally, a mechanical brake may be installed upon one or more wheels to prevent movement of the cart. Such a brake might include a cantilever braking arm having a pedal on one end for the user to step on to engage the brake. The user would lift the pedal with his/her foot to disengage the brake. The cantilever would include an intermediate pad to engage the wheel and biasing means (such as a spring) to hold the brake in place. The undercarriage frame 2 is further connected, on its top side, to at least one handle bar shaped underpinning 14 which curves upward and forward, and which extends across the width of the frame 2. The underpinning 14 and frame 2 are connected to, and support, a basket 16 (generally outlined in shadow lines) through side mounting brackets 18. The underpinning 14, front casters 8 and rear legs 12 may be secured to the frame 2 in any conventional manner, such as soldering and the like. The mounting brackets 18 may similarly be affixed in a conventional manner, such as rivets, bolts, soldering and the like.

The basket 16 includes front, side and bottom sections (20, 22, 24 and 26), each of which are constructed from a plurality of grid-like longitudinal and transverse bars extending in directions substantially perpendicular to one another. The longitudinal bars extend along a substantial length of the basket, while the transverse bars extend across a width thereof (such as in the front and bottom sections) and vertically along the side sections 22 and 24. Pads 32 are provided proximate the front corners of the basket to prevent denting and injuries. The basket 16 includes rear and intermediate seat sections 17 and 19 for seating two children in a front to back (in line) relation.

Rear and intermediate vertical support rods 34 and 36 are provided on opposite sides of the basket, in addition to the longitudinal and transverse bars forming the basket. The rear and intermediate vertical support rods 34 and 36 afford additional support for the seat sections. Rear and intermediate diagonal support rods 38 and 40 are provided proximate the rear and intermediate vertical support rods 34 and 36. The vertical and diagonal support rods 34, 36, 38 and 40 extend upward along opposite sides of the basket 16 at differing angles to enhance the rigidity thereof. Lower ends of the support rods 34–40 are secured to the side mounting brackets 18. Upper ends of the vertical support rods 34 and 36 are flattened to provide flanges 42 and 44 having holes therethrough. The flanges 42 and 44 receive axles 46 and 48 (FIG. 2), respectively, which extend across a width of the shopping cart. Upper ends of the diagonal support rods 38 and 40 are connected to a curved horizontal bracket 39 directed toward the rear end of the cart 1. The curved bracket 39 extends from the front seat 19 beyond a rearmost end of the cart 1 and downward to be secured to the cart 1. The curved bracket 39 receives a handle 50 (FIG. 1).

Figure 2:
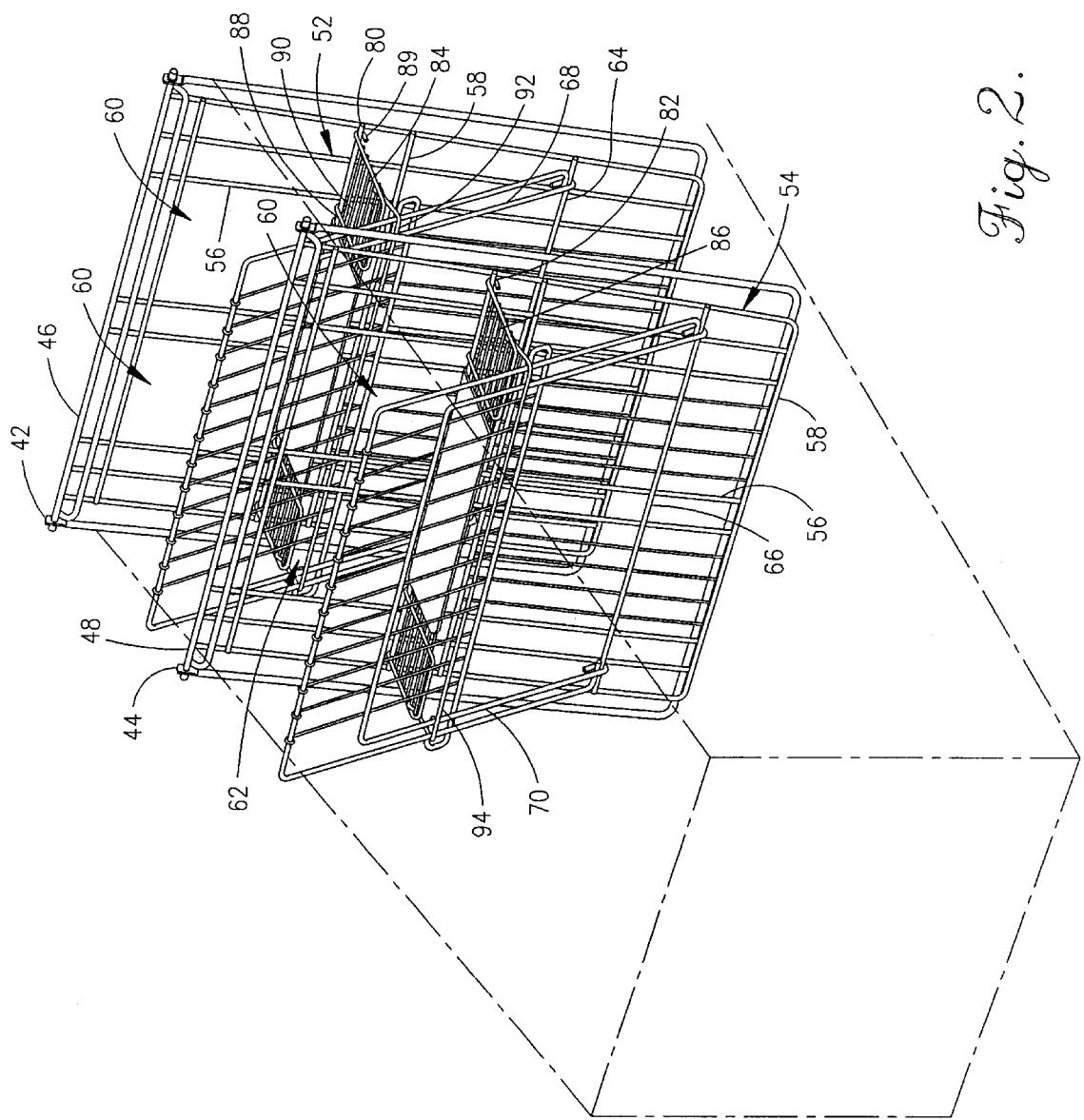
FIG. 2 illustrates an elevational view of a shopping cart according to the present invention.

As illustrated in FIG. 2, the axles 46 and 48 rotatably support rear and intermediate walls 52 and 54, respectively. The rear and intermediate walls 52 and 54 are constructed from vertical and horizontal bars 56 and 58 which are arranged perpendicular to one another to form a grid-like structure. The rear and intermediate walls 52 and 54 each include one or more openings 60 and 62 therethrough which receive the legs of a child placed in the rear and intermediate seat sections 17 and 19.

The rear and intermediate axles 46 and 48 extend through the corresponding flanges 42 and 44 and include end caps thereon. The rear and intermediate walls 52 and 54 include cross beams 64 and 66 proximate the bottom thereof and extending across a width thereof. The cross beams 64 and 66 pivotally support corresponding truss members 68 and 70 which extend upward therefrom. The truss members 68 and 70 extend upward at an angle with respect to the rear and intermediate walls 52 and 54 and are formed integral with back supports 72 and 74 for each seat 17 and 19. The back supports 72 and 74 are constructed from horizontal and vertical bars 76 and 78, with the outer horizontal bars being formed integrally with the truss members 68 and 70.

The rear and intermediate walls 52 and 54 further include rear and intermediate upper cross beams 80 and 82 located proximate the lower ends of the openings 60 and 62 therethrough. The upper cross beams 80 and 82 pivotally support one end of rear and intermediate seat rests 84 and 86. Each seat rest 84 and 86 is constructed to pivot from a horizontal position (at which it receives a child) to a substantially vertical position adjacent and parallel to corresponding end walls 52 and 54. The seat rests 84 and 86 are constructed from a plurality of longitudinal and transverse bars 88 and 90. The longitudinal bars 88 are constructed in a U-shape, with the outermost ends 89 of each leg being curled to hinge about the upper cross beams 80 and 82. The base of each U-shaped bar 88 receives a free spinning plastic tubular padding 91 thereabout to facilitate movement of the seat rests 84 and 86 between horizontal and vertical positions.

The seat sections 17 and 19 further include C-shaped guides 92 and 94 which interconnect the back supports 72 and 74 in a sliding relation to the seat rests 84 and 86. The C-shaped guides 92 and 94 include outermost ends 93 (FIG. 1) which are curled about at least one transverse bar 90 within each seat rests 84 and 86. The guides 92 and 94 project forward from the seat rests 84 and 86 and surround the back supports 72 and 74. The guides 92 and 94 enable the seat rests 84 and 86 to be pivoted from a horizontal to a vertical position while the back rests 72 and 74 move therewith. Specifically, the C-shaped guides 92 and 94 are pivotally secured to a transverse bar 90 of each seat rest 84 and 86 and rotate from a horizontal position (FIG. 1) (while the seat rests are in an open working position) to a position directed downward (FIG. 4) (while the seat rests are in a closed position).

Figure 3:
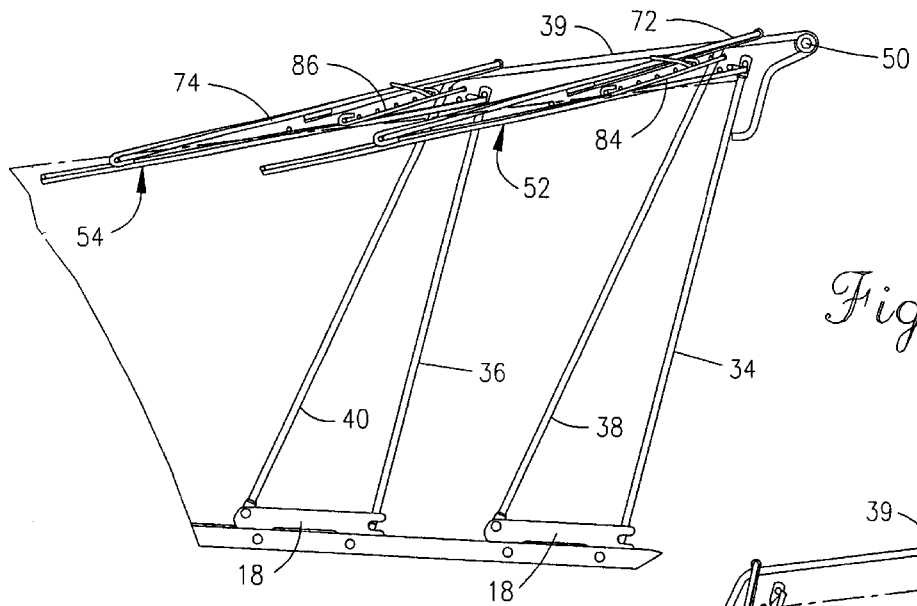
FIG. 3 illustrates a side sectional view of a shopping cart according to the present invention, while in an open position.

When in an open working position (FIGS. 1 and 2), the back supports 72 and 74 are folded outward until the seat rests 84 and 86 are oriented in a horizontal position and the guides 92 and 94 contact cross members 96 and 98 traversing the back supports 72 and 74. As the back supports 72 and 74 are pulled backward (to a closed position), they force the seat rests 84 and 86 upward. As the seat rests move upward, the guides 92 and 94 pivot downward to prevent binding engagement with the back supports 72 and 74. As shown in FIG. 3, both seats are pivotal upward to provide for interlocking carts during storage.

Figure 4:
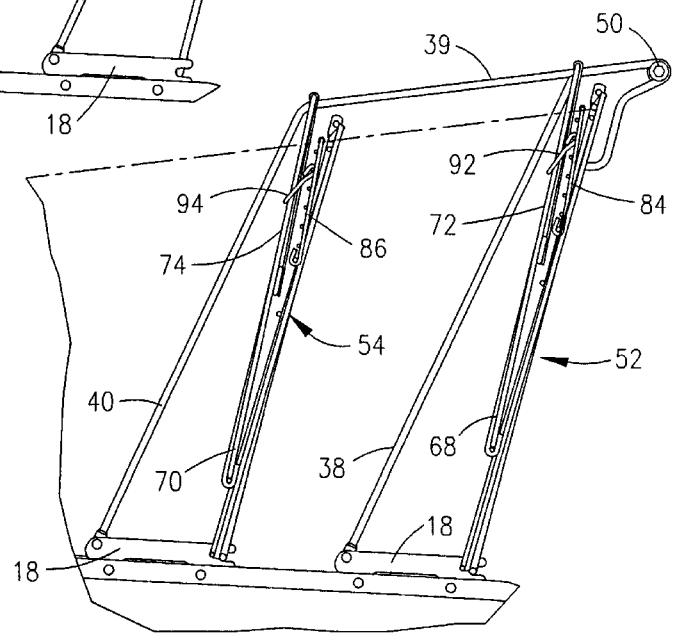
FIG. 4 illustrates a side sectional view of a shopping cart according to the present invention with both seats in a collapsed position.

As illustrated in FIG. 4, when the seats 17 and 19 are closed, the intermediate wall 54 produces a partition within the basket 16, thereby creating separate compartments. These separate compartments may be desirable to prevent more delicate items from being crushed (e.g. eggs, bread and the like) and to allow one person to shop for him/herself and a second person while keeping their groceries separate. When the seat rests 17 and 19 are in an open position, the chamber between the rear and intermediate walls 52 and 54 serves as leg room for the child located in the forwardmost seat.

Figure 5:
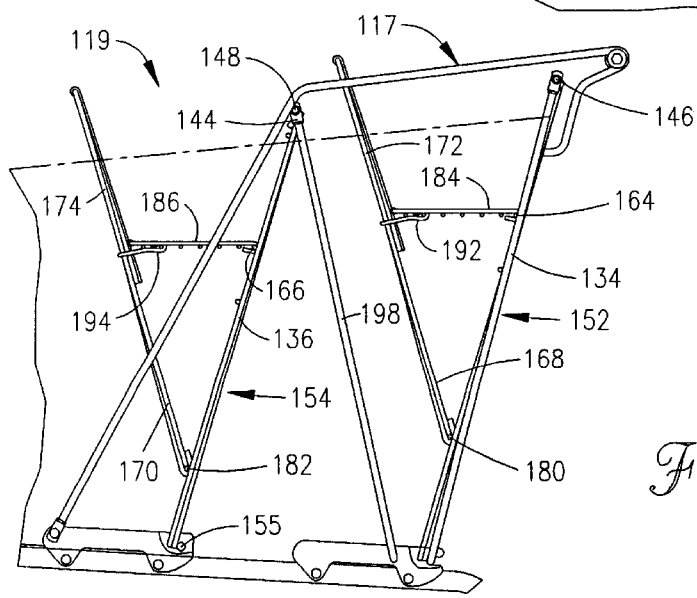
FIG. 5 illustrates a side sectional view of a shopping cart according to a second embodiment of the present invention.

FIG. 5 illustrates a second embodiment in which the forwardmost seat section 119 may be constructed to collapse against the rearmost seat section 117. Each seat section 117 and 119 includes rear and intermediate axles 146 and 148 which are pivotally mounted on rear and intermediate support rods 134 and 136. The axles 146 and 148 support rear and intermediate walls 152 and 154. Each wall 152 and 154 includes upper and lower cross beams (164, 166, 180 and 182) which pivotally support the seat rests 184 and 186 and the truss members 168 and 170. Each truss member 168 and 170 is integrally formed with the back supports 172 and 174 which are slidably connected to the seat rests 184 and 186 through the guides 192 and 194. In this embodiment, the intermediate axle 148 is supported within flanges 144 upon upper ends of pivotal support rods 198. The pivotal support rods 198 include lower ends which are pivotally hinged to the rearmost mounting brackets 118. The pivotal support rods 198 are rotatable from a position immediately adjacent the rear vertical support rods 134 to a position remote therefrom (as illustrated in FIG. 5). The pivotal support rods 198, when extended to a working position, rotate outward into a position contacting the diagonal support rods 140.

When in a collapsed position, the support rod 198 pivots in a clockwise manner (relative to FIG. 5) to a position immediately adjacent the support rod 134. As the support rod 198 rotates, it carries the rear wall 154 and the seat section 119 therewith. The lowermost end of the rear wall 154 disengages the floor of the basket as the support rod 198 is rotated to a collapsed position. When in a working position, the lower end of the rearmost wall 154 engages the floor of the basket 116 and abuts against a transverse support rod 155 (FIG. 5).

While the foregoing invention has been illustrated with respect to a single type of shopping cart, it is to be understood that the claimed invention is not so limited. Instead, the inventive concept of providing multiple child seats within a single shopping cart may be utilized within any conventional shopping cart. For instance, the inventive concept of providing multiple in-line child seats may be included within those types of shopping carts (such as in Romero) having a basket section pivotally connected to the front end of the child seat section and a horizontal support. The basket section rotates upward about this pivot point to a vertical position during storage. Clearly, the present invention may be implemented within with such a shopping cart by providing a second child seat between the first existing child seat and the hinge point of the basket. In such a cart, the second child seat would include side, back and bottom walls similar to those of the first seat. Holes would be provided through the bottom of the second child seat section proximate the back of the first seat for the child's legs. The first and second child seats and the basket section would be supported upon a horizontal support bar fixedly mounted upon a base having wheels thereon. The basket section would be hingedly mounted from a point upon the support bar proximate the front of the second or forwardmost child's seat. The second child seat would be constructed consistent with the advantages and objects of the present invention as described in connection with the preferred embodiments.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. In a shopping cart having a basket frame supported by an undercarriage frame with wheels attached thereto, the improvement comprising:

first and second seat sections for supporting in each section a child, wherein said sections are positioned in tandem one in front of the other along a longitudinal axis of said cart and wherein each of said sections is pivotally mounted to said basket frame in such a manner as to permit the section to be collapsed and pivoted upwardly to a substantially horizontal position so that said cart may receive a portion of a second cart for purposes of storage.

2. A shopping cart for carrying two or more children, said cart comprising:

a basket frame supported by an undercarriage frame with wheels attached thereto; and first and second seat sections positioned in tandem one in front of the other along a longitudinal axis of said cart wherein each of said first and second seat sections comprises a rear wall pivotally mounted to said basket frame, a back support, and a seat bottom extending between said rear wall and said back support, said rear wall being pivotally mounted to said basket frame in such a manner as to permit the rear wall to be pivoted upwardly to a substantially horizontal position so that said cart may receive a portion of a second cart for purposes of storage.

3. A shopping cart according to claim 2, wherein said back support and said seat bottom are connected in such a manner as to permit the back support and seat bottom to be collapsed against the rear wall.

4. A shopping cart according to claim 3, wherein said seat bottom is pivotally mounted to said rear wall.

5. A shopping cart according to claim 4, wherein said back support is slidably joined with said seat bottom.

6. A shopping cart according to claim 5, wherein said back support is pivotally connected to said rear wall.

7. A shopping cart according to claim 6, wherein said back support is integrally formed with trusses which are rotatably mounted upon said rear wall.

8. A shopping cart according to claim 6, wherein said cart is adapted to be placed into a storage position such that when a second cart is pushed against the rear wall of said first seat section, the rear wall of each of said seat sections is pivoted upwardly and forwardly causing each of said seat bottoms to slide upwardly along each of said back supports until each of said seat bottoms and back supports collapse upon the respective rear wall, and wherein the collapsed seat sections are pushed upwardly into a substantially horizontal position such that a portion of said second cart can be stored within an interior portion of the basket frame.

9. A shopping cart according to claim 2, wherein said rear wall includes a top axle which extends between, and is pivotally mounted upon, vertical support rods which extend upward along opposite sides of said basket frame.

10. In a shopping cart having a basket frame supported by an undercarriage frame with wheels attached thereto, the improvement comprising first and second seat sections positioned in tandem along a longitudinal axis of said cart wherein each of said first and second seat sections comprises:

a rear wall having a top axle extending between and pivotally mounted upon vertical support rods which extend upward along opposite sides of said basket frame;

a back support having a top support section and a bottom mounting section wherein the bottom mounting section is pivotally connected to said rear wall; and a seat bottom pivotally mounted to said rear wall and slideably connected to said back support, wherein said seat section may be alternatively placed into a use position such that the seat bottom extends between the rear wall and the back support in a generally horizontal direction parallel the floor of the basket frame, and a collapsed position such that the seat bottom and back support are collapsed in a generally vertical position against the rear wall.

11. A shopping cart according to claim 10, wherein said bottom mounting section of said back support comprises trusses which are rotatably mounted upon said rear wall.

12. A shopping cart according to claim 10, wherein said cart is adapted to be placed into a storage position such that when a second cart is pushed against the rear wall of said first seat section, the seat sections are placed into the collapsed position and the collapsed seat sections are pivoted forwardly and upwardly into a substantially horizontal position such that a portion of the second cart is received within an interior portion of the basket frame.

* * * * *